(12) United States Patent
Li

(10) Patent No.: US 7,126,817 B2
(45) Date of Patent: Oct. 24, 2006

(54) HARD DISK-MOUNTING MODULE

(75) Inventor: Chao-Yu Li, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 9 days.

(21) Appl. No.: 11/121,869

(22) Filed: May 3, 2005

(65) Prior Publication Data

US 2006/0171110 A1    Aug. 3, 2006

(30) Foreign Application Priority Data

Feb. 2, 2005    (TW) ............................. 94201905 U

(51) Int. Cl.
*G06F 1/16* (2006.01)

(52) U.S. Cl. ................. 361/685; 360/98.01; 312/223.2

(58) Field of Classification Search ........ 361/679–687, 361/724–727; 248/300, 694, 317, 291; 312/223.1, 312/223.2, 330.1; 360/97.01, 98.01, 137, 360/137 D See application file for complete search history.

(56) References Cited

U.S. PATENT DOCUMENTS

| | | | |
|---|---|---|---|
| 6,392,884 B1* | 5/2002 | Chou .......................... | 361/687 |
| 6,768,638 B1* | 7/2004 | Shih ........................... | 361/685 |
| 6,781,827 B1* | 8/2004 | Goodman et al. .......... | 361/685 |
| 6,853,548 B1* | 2/2005 | Vanderheyden et al. .... | 361/685 |

* cited by examiner

*Primary Examiner*—Hung Van Duong
(74) *Attorney, Agent, or Firm*—Townsend and Townsend and Crew LLP

(57) ABSTRACT

A hard disk-mounting module includes a drawable mounting frame and at least one tray member. The mounting frame includes a frame body, and at least one electrical connector mounted on the frame body and adapted for electrical connection with a hard disk. The tray member is adapted to carry the hard disk thereon, and is slidably mounted on the frame body so as to be slidable relative to the electrical connector between a connecting position, in which the hard disk carried by the tray member is electrically connected to the electrical connector, and a disconnecting position, in which the hard disk is electrically disconnected from the electrical connector.

9 Claims, 6 Drawing Sheets

HARD DISK-MOUNTING MODULE

CROSS-REFERENCE TO RELATED APPLICATION

This application claims priority of Taiwanese Application No. 094201905, filed on Feb. 2, 2005.

BACKGROUND OF THE INVENTION

1. Field of the Invention

The invention relates to a hard disk-mounting module, more particularly to a drawable hard disk-mounting module for mounting in a computer server housing.

2. Description of the Related Art

A computer server requires many hard disks for storing large amounts of data. The hard disks are required to be removable from the computer server so as to facilitate replacement and maintenance thereof. While the space inside a computer server is limited, it is important to place as many hard disks in the computer server as possible so as to minimize costs.

Conventionally, the hard disks are respectively mounted in drawable cartridges, and the cartridges are then mounted removably in the computer server housing. As shown in FIG. 1, four hard disks 91 are respectively mounted in mounting frames 93 with handles 92. The mounting frames 93 with the hard disks 91 are disposed in parallel in a front space of a server housing 94 in such a manner that the handles 92 are exposed outwardly of the server housing 94 for facilitating drawing of the mounting frames 93. As a consequence, the number of the hard disks 91 placed in the computer server housing 94 cannot be increased, and a rear space of the server housing 94 cannot be utilized.

SUMMARY OF THE INVENTION

Therefore, the object of the present invention is to provide a hard disk-mounting module that is adapted to be mounted in a computer server housing and that can overcome the aforesaid drawbacks of the prior art.

Accordingly, a hard disk-mounting module of this invention comprises a drawable mounting frame and at least one tray member.

The mounting frame is adapted to be removably mounted in the computer server housing, and includes a frame body, and at least one electrical connector mounted on the frame body and adapted for electrical connection with a hard disk.

The tray member is adapted to carry the hard disk thereon, and is slidably mounted on the frame body so as to be slidable relative to the electrical connector between a connecting position, in which the hard disk carried by the tray member is electrically connected to the electrical connector, and a disconnecting position, in which the hard disk is electrically disconnected from the electrical connector.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
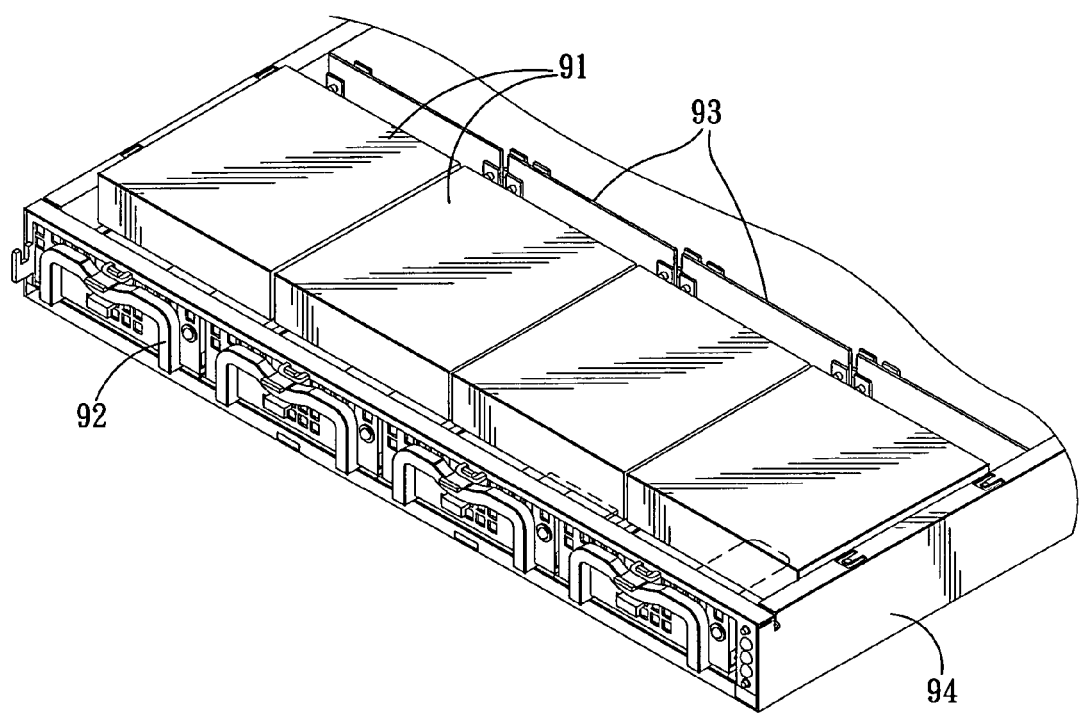
FIG. 1 is a perspective view of a conventional hard disk-mounting module.
Figure 2:
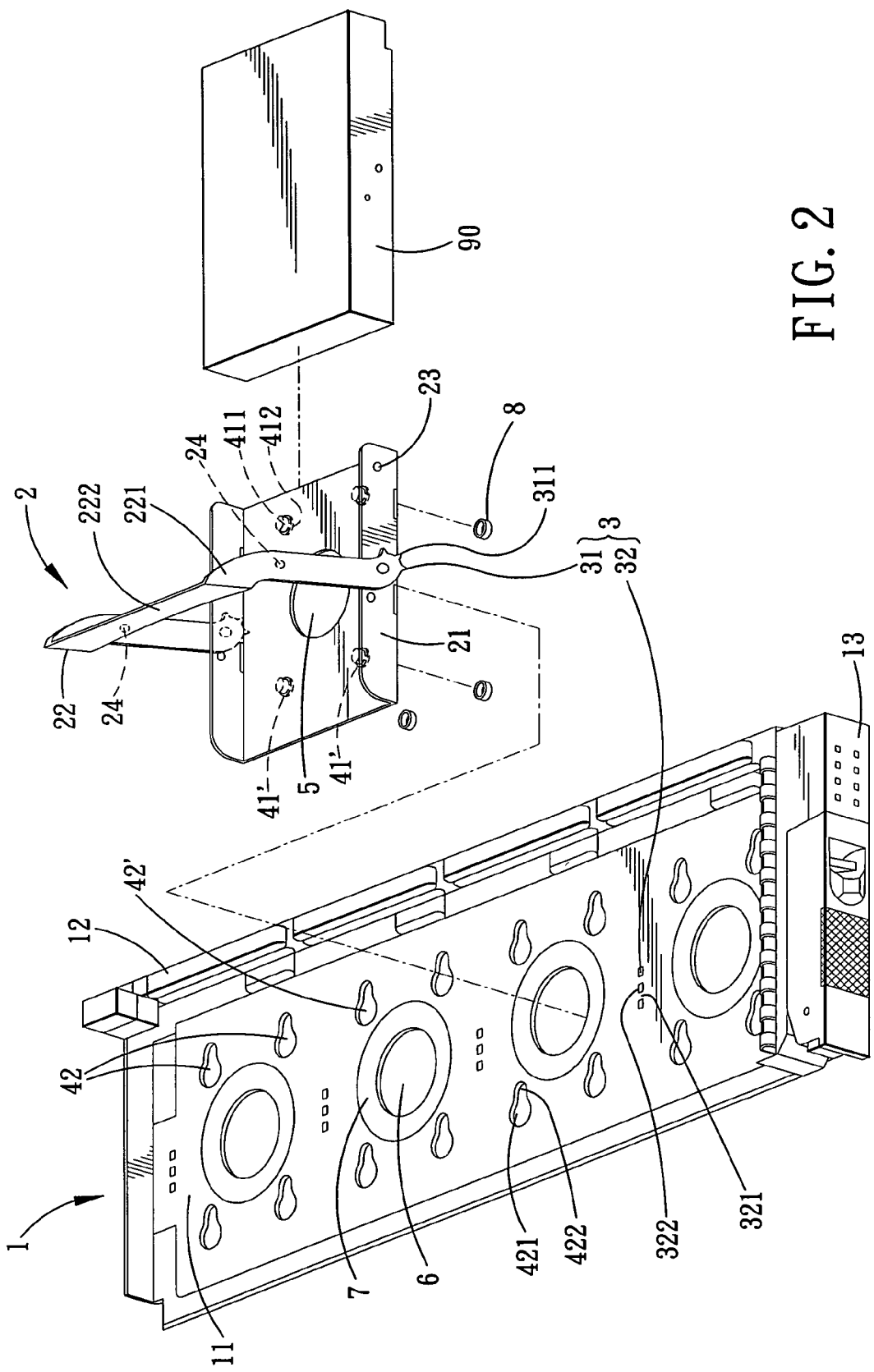
FIG. 2 is an exploded perspective view of the preferred embodiment of a hard disk-mounting module according to the present invention.
Figure 3:
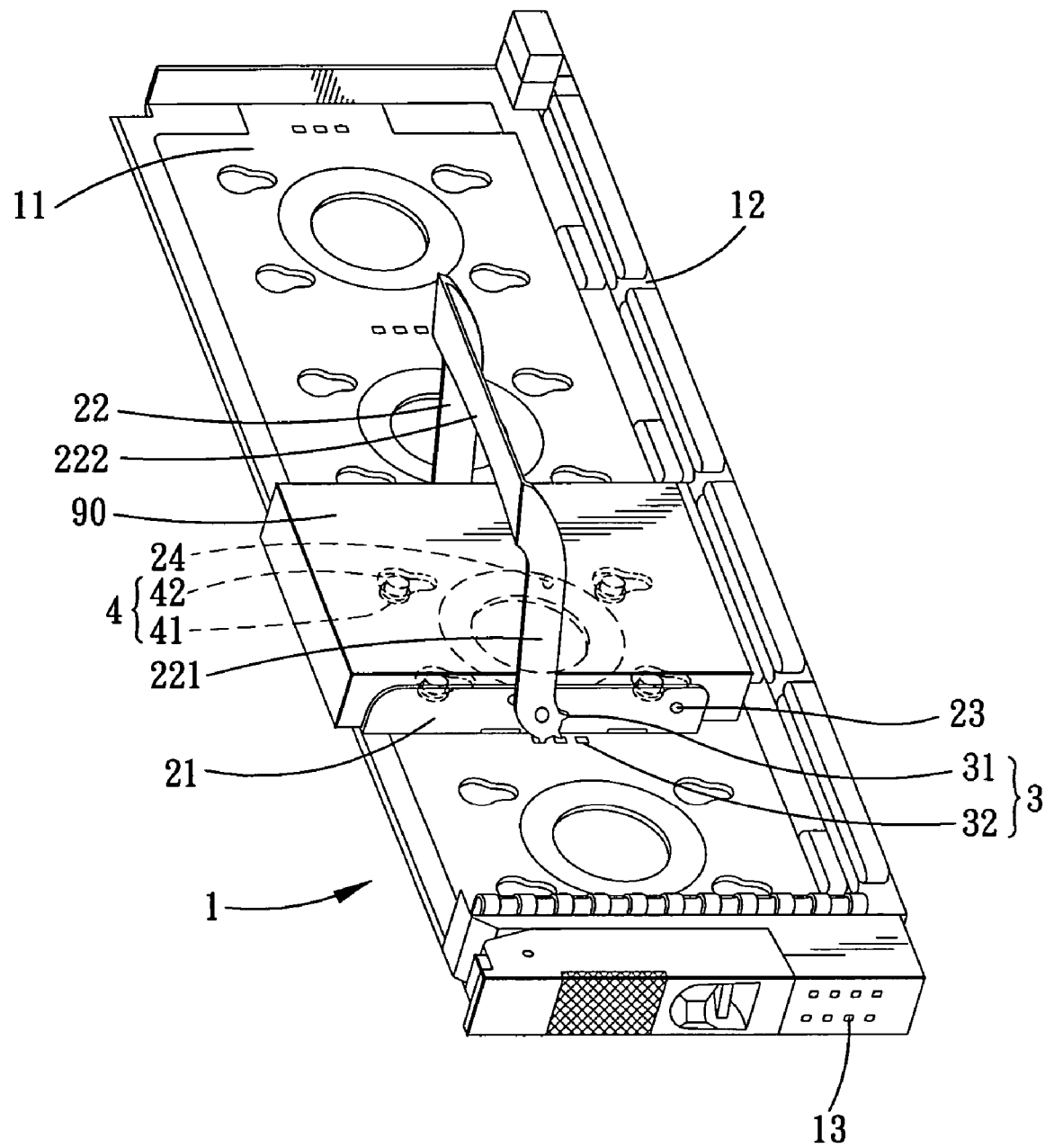
FIG. 3 is an assembled perspective view of the preferred embodiment.

Referring to FIGS. 2 and 3, the preferred embodiment of a hard disk-mounting module for mounting at least one hard disk 90 thereon is shown to be adapted to be mounted removably in a computer server housing (not shown herein). The hard disk-mounting module includes a removable mounting frame 1 and four tray members 2. In practice, the number of the hard disks 90 is not limited to four, and can be adjusted in accordance with actual requirements.

The mounting frame 1 is adapted to be removably mounted in the computer server housing, and includes a frame body 11, and four electrical connectors 12 mounted on the frame body 11 and adapted for connecting with the hard disks 90, respectively.

Figure 6:
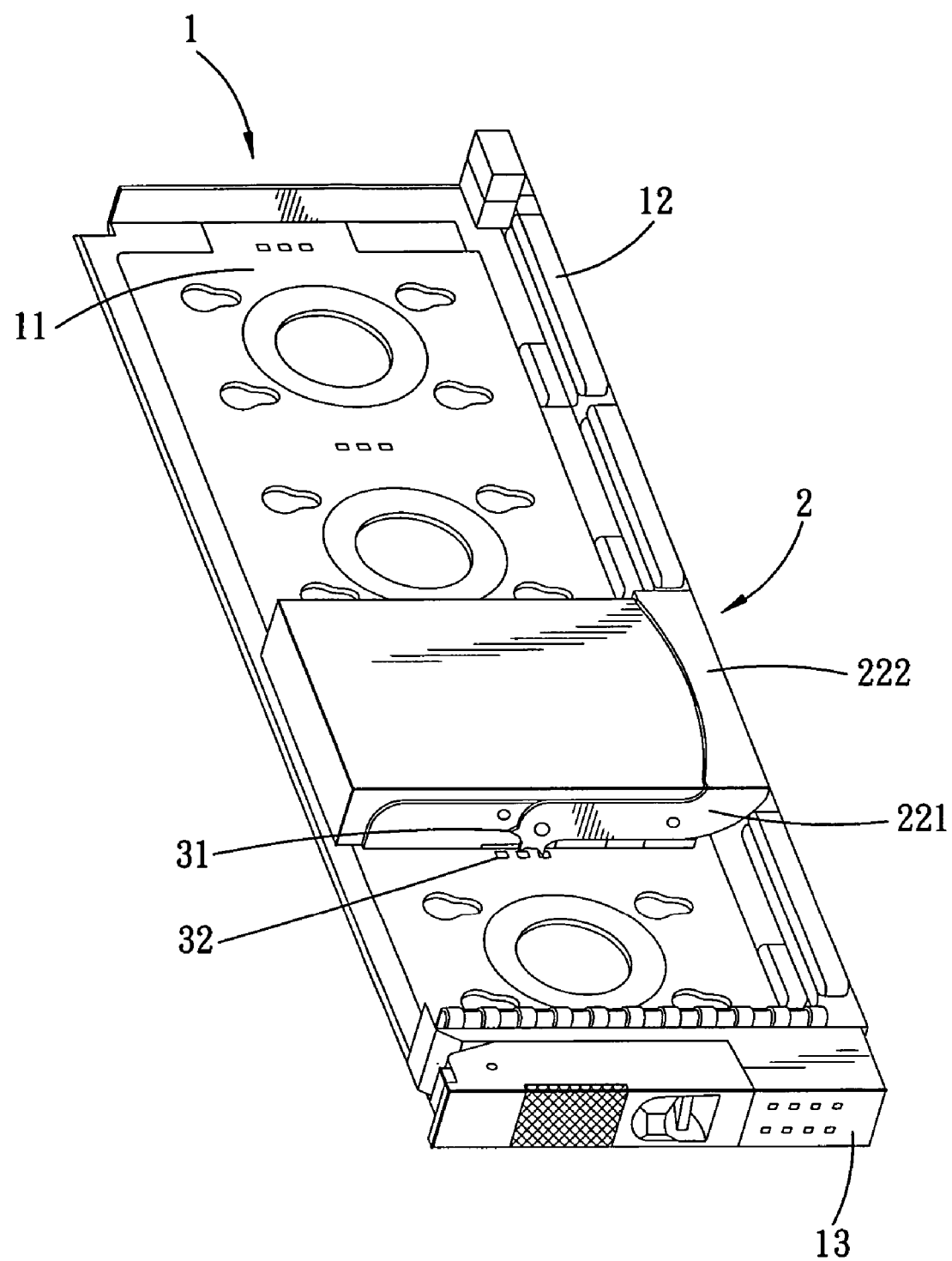
FIG. 6 is an assembled perspective view of the preferred embodiment with a hard disk mounted thereon.

Each of the tray members 2 includes a generally U-shaped plate 21 adapted to carry a hard disk 90 thereon, and is slidably mounted on the frame body 11 so as to be slidable relative to the respective electrical connector 12 between a connecting position, in which the hard disk 90 carried by the tray member 2 is electrically connected to the respective electrical connector 12, as best shown in FIG. 6, and a disconnecting position, in which the hard disk 90 is electrically disconnected from the respective electrical connector 12, as best shown in FIG. 3.

The hard disk-mounting module further includes a positioning unit 3 that has a first engaging member 31 provided on the tray member 2, and a second engaging member 32 provided on the frame body 11. The first engaging member 31 is formed with a plurality of first teeth 311. The second engaging member 32 is formed with a plurality of second teeth 321 which mesh with the first teeth 311 (in this embodiment, a hole 322 is formed between two adjacent ones of the second teeth 321 so as to mesh with a respective one of the first teeth 311). In this embodiment, the first engaging member 31 is mounted rotatably on the tray member 2 and is thus rotatable relative to the second engaging member 32 so as to permit sliding movement of the tray member 2 on the frame body 11 when the first engaging member 31 is rotated.

The positioning unit 3 further includes an operating lever 22 that has a pair of first arms 221 and a second arm 222 that interconnects the first arms 221. The first teeth 311 of the first engaging member 31 are formed on lower ends of the first arms 221.

Figure 4:
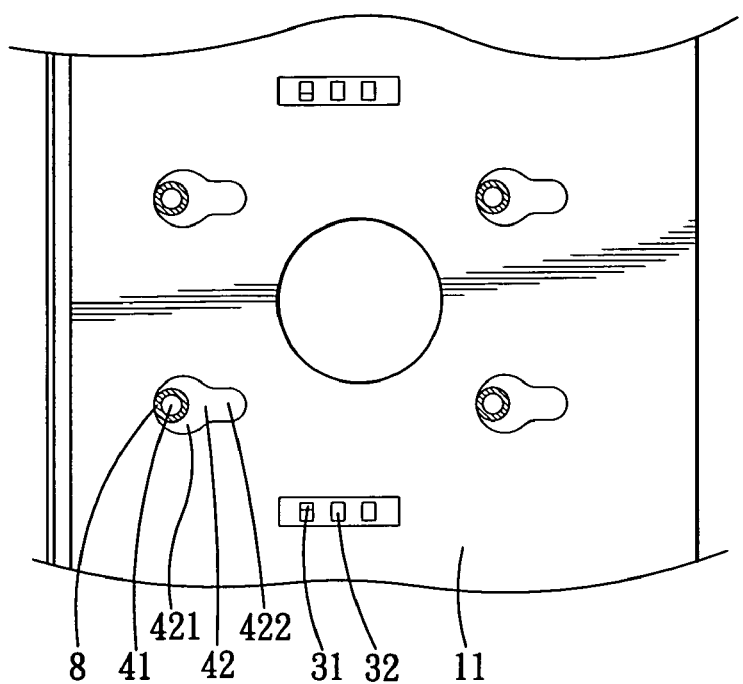
FIG. 4 is a fragmentary partly sectional view to illustrate a tray member of the preferred embodiment in a disconnecting position.
Figure 5:
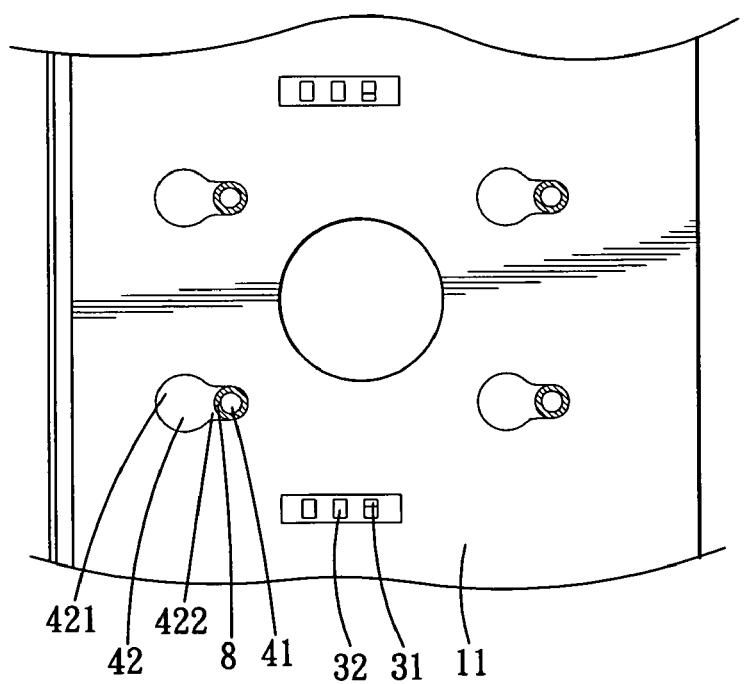
FIG. 5 is a fragmentary partly sectional view to illustrate the tray member of the preferred embodiment in a connecting position.

The hard disk-mounting module further includes an alignment unit 4 that includes a first alignment member 41 having a plurality of alignment posts 41', and a second alignment member 42 having a plurality of alignment holes 42'. Each of the alignment posts 41' protrudes downwardly from the tray member 2, and includes a stem 411 and a head 412 extending downwardly and enlarged in diameter from the stem 411. Each of the alignment holes 42' is formed in the frame body 11, is registered with a respective one of the alignment posts 41', and has a first section 421 which has a diameter larger than that of the head 412 of the respective one of the alignment posts 41' so as to permit the respective one of the alignment posts 41' to pass therethrough when the tray member 2 is disposed at the disconnecting position (see FIG. 4), and a second section 422 which extends and which is reduced in cross-section from the first section 421, which receives fittingly the respective one of the alignment posts 41' when the tray member 2 is disposed at the connecting position (see FIG. 5), and which has a diameter less than that of the head 412 of the respective one of the alignment posts 41' so as to prevent undesired removal of the tray member 2 from the frame body 11.

The hard disk-mounting module further includes an interlocking unit for positioning the operating lever 22 at a horizontal position, in which the operating lever 22 extends in a direction parallel to the tray member 2, when the tray member 2 is disposed at the connecting position. In this embodiment, the interlocking unit includes a first interlocking member that has at least one tongue 23 formed on one of the first arms 221, and a second interlocking member that has at least one groove 24 formed in the tray member 2. The tongue 23 on the operating lever 22 engages releasably the groove 24 in the tray member 2 when the operating lever 22 is disposed at the horizontal position. Since there are various interlocking mechanisms available in the art, the particular interlocking mechanism employed in this embodiment will not be further detailed herein.

The U-shaped plate 21 of each of the tray members 2 is formed with a first heat-dissipating hole 5. The frame body 11 is formed with a plurality of second heat-dissipating holes 6 that are respectively registered with the first heat-dissipating holes 5 in the tray members 2 when the latter are disposed at the connecting position for dissipating heat generated by activation of the hard disks 90 on the tray member 2.

The hard disk-mounting module further includes a plurality of first ring-shaped cushion pads 8, each of which is sleeved on the stem 411 of a respective one of the alignment posts 41' for absorbing vibration resulting from activation of the hard disk 90 on the tray member 2, and a plurality of second ring-shaped cushion pads 7, each of which is sleeved on a periphery of a respective one of the second heat-dissipating holes 6 in the frame body 11 for absorbing vibration resulting from activation of the hard disk 90 on the tray member 2.

Referring to FIGS. 3 and 6, in operation, the operating lever 22 is operable to rotate the first engaging member 31 in a direction such that the tray member 2 together with the hard disk 90 is moved toward the respective electrical connector 12 by virtue of engagement between the first and second teeth 311, 321, and that each of the alignment posts 41' is received fittingly in the second section 422 of the respective one of the alignment holes 42' when the tray member 2 is moved to the connecting position. The tray member 2 is prevented from moving in a vertical direction by the engagement between the alignment posts 41' and the alignment holes 42' and from moving horizontally by engagement between the first and second teeth 311, 321. A reverse operation of the operating lever 22 causes the tray member 2 to be moved to the disconnecting position.

Figure 7:
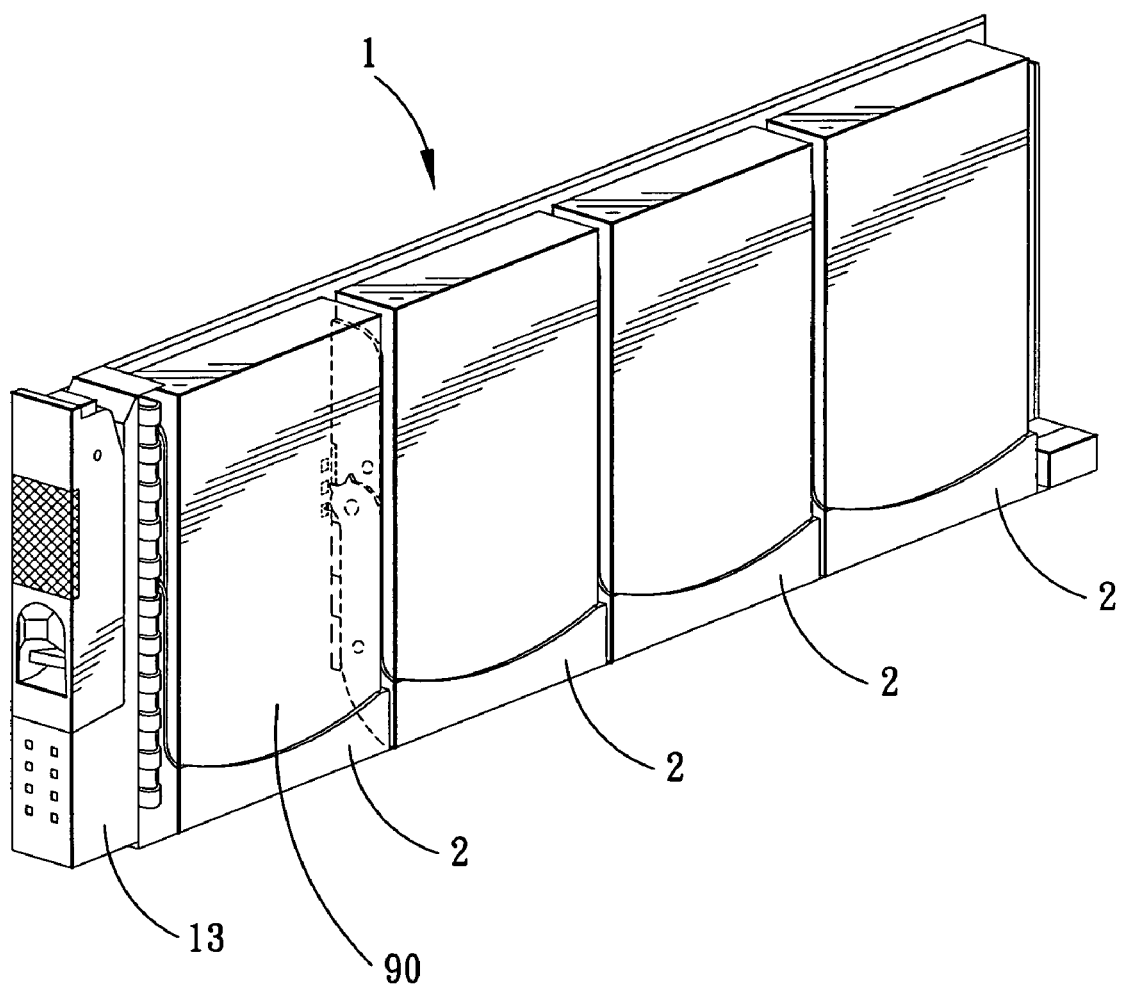
FIG. 7 is an assembled perspective view of the preferred embodiment with four hard disks mounted thereon.

Referring to FIG. 7, a pull lever 13 is provided on a front side of the frame body 11 for facilitating removal of the hard disk-mounting module from the computer server housing.

The pull lever 13 has a positioning mechanism for preventing the frame body 1 from escaping from the computer serve housing.

In sum, the hard disk-mounting module of this invention fully utilizes the space in a computer server housing, and can increase the number of hard disks to be mounted in the computer server housing. Moreover, with the inclusion of the tray members 2 in the hard disk-mounting module of this invention, replacement operations of the hard disks 90 become relatively convenient.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A hard disk-mounting module adapted to be mounted in a computer server housing, comprising:
    a removable mounting frame that is adapted to be mounted in the computer server housing and that includes
        a frame body, and
        at least one electrical connector mounted on said frame body and adapted for electrical connection with a hard disk; and
    at least one tray member that is adapted to carry the hard disk thereon and that is slidably mounted on said frame body so as to be slidable relative to said electrical connector between a connecting position, in which the hard disk carried by said tray member is electrically connected to said electrical connector, and a disconnecting position, in which the hard disk is electrically disconnected from said electrical connector.

2. The hard disk-mounting module as claimed in claim 1, further comprising a positioning unit that includes a first engaging member provided on said tray member and formed with a plurality of first teeth, and a second engaging member provided on said frame body and formed with a plurality of second teeth which mesh with said first teeth, one of said first and second engaging members being rotatable relative to the other of said first and second engaging members so as to permit sliding movement of said tray member on said frame body when said one of said first and second engaging members is rotated.

3. The hard disk-mounting module as claimed in claim 1, further comprising an alignment unit that includes a first alignment member having a plurality of alignment posts, and a second alignment member having a plurality of alignment holes, each of said alignment posts protruding downwardly from said tray member and having a stem and a head extending downwardly and enlarged in diameter from said stem, each of said alignment holes being formed in said frame body, being registered with a respective one of said alignment posts, and having a first section which has a diameter larger than that of said head of the respective one of said alignment posts so as to permit the respective one of said alignment posts to pass therethrough when said tray member is disposed at the disconnecting position, and a second section which extends and which is reduced in cross-section from said first section, which receives fittingly the respective one of said alignment posts when said tray member is disposed at the connecting position, and which has a diameter less than that of said head of the respective one of said alignment posts so as to prevent undesired removal of said tray member from said frame body.

4. The hard disk-mounting module as claimed in claim 1, wherein said tray member is formed with a first heat-dissipating hole, said frame body being formed with a second heat-dissipating hole that is registered with said first heat-dissipating hole when said tray member is disposed at the connecting position.

5. The hard disk-mounting module as claimed in claim 2, wherein said first engaging member is mounted rotatably on said tray member, said positioning unit further including an operating lever that extends from said first engaging member for rotating said first engaging member.

6. The hard disk-mounting module as claimed in claim 3, further comprising a plurality of ring-shaped cushion pads, each of which is sleeved on said stem of a respective one of said alignment posts for absorbing vibration resulting from activation of the hard disk on said tray member.

7. The hard disk-mounting module as claimed in claim 4, further comprising a ring-shaped cushion pad that is sleeved on a periphery of said second heat-dissipating hole in said frame body for absorbing vibration resulting from activation of the hard disk on said tray member.

8. The hard disk-mounting module as claimed in claim 5, wherein said operating lever is disposed at a horizontal position, in which said operating lever extends in a direction parallel to said tray member, when said tray member is disposed at the connecting position, said hard disk-mounting module further comprising an interlocking unit for positioning said operating lever at the horizontal position.

9. The hard disk-mounting module as claimed in claim 8, wherein said interlocking unit includes a first interlocking member that has a tongue formed on said operating lever, and a second interlocking member that has a groove formed in said tray member, said tongue on said operating lever engaging said groove in said tray member when said operating lever is disposed at the horizontal position.

\* \* \* \* \*